Dec. 27, 1927.
C. DE W. WAGNER
1,653,936
SHEET METAL SHEAR GUIDE
Filed April 18, 1923
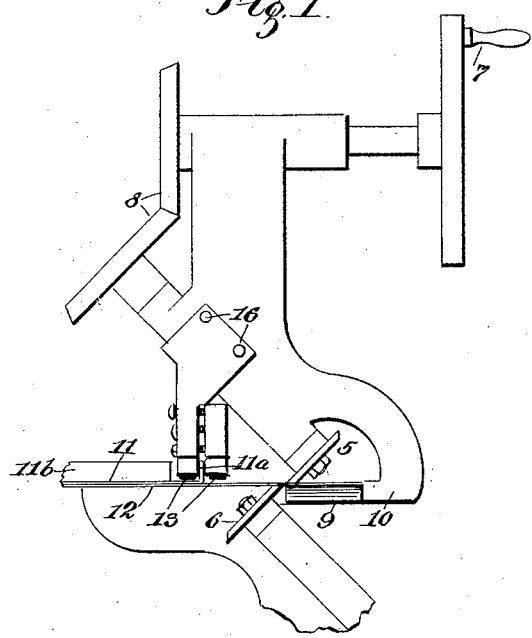
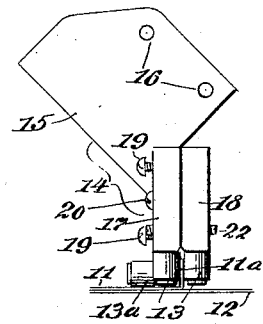

Patented Dec. 27, 1927.

1,653,936

UNITED STATES PATENT OFFICE.

CLINTON DE WITT WAGNER, OF CEDAR RAPIDS, IOWA.

SHEET-METAL SHEAR GUIDE.

Application filed April 18, 1923. Serial No. 632,873.

This invention relates to shears used for cutting the heavier grades of sheet metal, and embodies certain improvements in guides for the material treated by such shears as illustrated and described in a former Patent, No. 1,410,972, issued to me on the 28th day of March, 1922. Such former patent related, mainly to the cutting of curved forms, but the principle object of this invention is to adapt the guide to the cutting of straight strips, as well as curved forms. Other objects will appear in the description and claims following, reference being had to the accompanying drawing, in which:—

Fig. 1 is a fragmentary side elevation of a shear adapted for the cutting of rather heavy sheet stock, and shown conventionally, with the guide attached thereto. Fig. 2 is a similar, enlarged view of the guide detached. Fig. 3 is an elevation of the same as seen from the right. Fig. 4 is an elevation of the same as seen from the left of Fig. 2, with the straight-strip guide attached. Fig. 5 is a fragmentary view of Fig. 4 as seen from the right. Fig. 6 shows the straight-strip guide detached.

In the drawing the shear is of the rotary type, having cutters 5 and 6 mounted on diagonal arbors, and driven by a crank 7 and gears 8. The shear is of the "throatless" type, also, the cutting 9 passing under the part 10 of the main frame, whereby the cut-off portion may be of any desired width. For the cutting of duplicate forms a template 11 is provided, to which the parent sheet 12 is suitably clamped, as fully set forth in the patent above referred to. The template has an upturned rib 11ª which runs between four rollers 13, and so controls the course of the sheet as cut. The part 11ᵇ is a stiffener, as of wood, to reinforce the template.

The guide comprises, with the rollers, a carrying stock or frame 14, with a semi-cylindrical head 15 attachable to the shear frame by screws or bolts 16. From this head depends a straight, flat shank 17, carrying a pair of rollers below it. A companion shank-plate 18 is attached to it adjustably by spacing-screws 19 and tension-screws 20. The respective shanks are bored at 21 for studs to carry the rollers, the studs being held in place by set-screws 22. The middle stud has a horizontal bearing for its roller 13ª, which serves to hold the template down on the bed-plate of the shear, as indicated in Fig. 2. In practice it will sometimes happen that the horizontal portion of the template must be too narrow to be held by this lateral roller. In such a case the roller is dispensed with, and a simple, right-angled stud 23, disposed as shown in Fig. 3, is used as a shoe to hold the template in place. Multiple stud-holes for the vertical rollers are provided, since in the cutting of short curves the rollers must be brought nearer together (as respects the advancing movement of the template) than when the curve is longer. The extreme spread of the rollers, for curved work, is however too little to serve as a guide in the slitting of long, straight strips and supplemental guides are accordingly provided, as will now be described.

Referring to Figs. 4, 5 and 6, it will be seen that the rollers have been detached from the depending shanks, and to each is attached an offset bar 24, carrying at each end a roller 13ᵇ. The middle, offset portion of each bar is provided with up-standing studs 25 registering with the outer stud-holes of the guide shanks, and held in place by the same set-screws used for the original roller-studs. The drop of this offset part corresponds to the drop of the end rollers, and the rib of the template passes between them all. It will be evident that the template, with its straight rib, will be carried in a perfectly straight path between the guides, and the severed strips will be correspondingly straight. The adjacent cheeks of the guide-bars at the middle serve to guide the template until it completely passes the shear, and the cut is thus perfectly straight from end to end. These cheeks also prevent any tendency of the template rib to buckle, even though formed of comparatively light stock.

The attachment admits of a shift being made from the cutting of curves to the cutting of straight strips in a few moments, and without disturbing the position of the roller stock, the setting of which is a matter of some nicety, as appears in the patent above mentioned.

Having thus described my invention, I claim:

1. A cutting guide for rotary metal-shears, comprising a movable ribbed template, a pair of depending shank with seats in each, for a pair of guide-roller bearings, means for detachably securing said bearings, and a pair of extended guide-bars downwardly offset in the middle, with studs to register with the roller-bearing seats, and vertically disposed rollers near each end.

2. In combination with a sheet-metal shear guide having a pair of depending shanks with seats for removable roller bearings in their lower edges, a pair of extension guide-bars downwardly offset in the middle, with projections in the offsets to register with said seats, and end rollers in line with said offsets.

3. In combination with a sheet metal shear guide, comprising an upwardly ribbed movable template, a pair of depending shanks, each carrying a pair of depending rollers, to straddle the template ribs in pairs, and a shoe depending from one shank and between its pair of rollers, and extending a little below them, to bear on the upper face of the template near its rib and hold it downwardly.

In testimony whereof I affix my signature.

CLINTON DE WITT WAGNER.